(12) United States Patent
Petrushevsky et al.

(10) Patent No.: US 10,578,831 B2
(45) Date of Patent: Mar. 3, 2020

(54) MECHANISM, SYSTEM AND METHOD FOR REDUCING INTERNAL AIR TEMPERATURE GRADIENT IN A CENTRALLY-OBSCURED REFLECTIVE TELESCOPE

(71) Applicant: Elbit Systems Electro-optics—Elop Ltd, Rehovot (IL)

(72) Inventors: Vladimir Petrushevsky, Rehovot (IL); Idan Diamant, Rehovot (IL); Iliya Golub, Rehovot (IL); David Herskovits, Rehovot (IL); Shira Giladi, Rehovot (IL)

(73) Assignee: ELBIT SYSTEMS ELECTRO-OPTICS—ELOP LTD., Rehovot (IL)

( * ) Notice: Subject to any disclaimer, the term of this patent is extended or adjusted under 35 U.S.C. 154(b) by 91 days.

(21) Appl. No.: 15/922,724

(22) Filed: Mar. 15, 2018

(65) Prior Publication Data
US 2019/0204534 A1 Jul. 4, 2019

(30) Foreign Application Priority Data
Jan. 2, 2018 (IL) .......................................... 256709

(51) Int. Cl.
*G02B 23/00* (2006.01)
*G02B 7/18* (2006.01)
(Continued)

(52) U.S. Cl.
CPC .......... *G02B 7/1815* (2013.01); *G02B 17/08* (2013.01); *G02B 23/02* (2013.01); *G02B 23/16* (2013.01)

(58) Field of Classification Search
CPC ........ G02B 17/08; G02B 23/02; G02B 23/16; G02B 7/1815; G02B 7/18; G02B 23/00; G02B 7/195; G02B 7/192; G02B 21/28
See application file for complete search history.

(56) References Cited

U.S. PATENT DOCUMENTS 3,791,713 A 2/1974 Mackay
4,606,620 A * 8/1986 Nagano ................. F28F 13/003
359/845
(Continued)

FOREIGN PATENT DOCUMENTS

CN 106772999 A 5/2017
JP 6250102 B1 12/2017

OTHER PUBLICATIONS

Mobberley M., Lunar and Planetary Webcam User's Guide, pp. 33-36, Springer, 2006.
(Continued)

*Primary Examiner* — William R Alexander
*Assistant Examiner* — Balram T Parbadia
(74) *Attorney, Agent, or Firm* — Knobbe, Martens, Olson & Bear, LLP

(57) ABSTRACT

In some embodiments, a catadioptric optical system (CDOS) including a centrally obscured reflective telescope is disclosed, which includes: a telescope compartment defining a telescope space therein, a primary reflector including a central opening and a secondary reflector. The reflectors are located in the telescope compartment. The CDOS also includes a mechanism for reducing temperature gradient in the telescope space. The mechanism includes an air duct including a first opening and a second opening; a hollow enclosure including side openings and one or more airflow generation devices. The mechanism is configured for forming an air passageway between the airflow generation device and the inner telescope space via the air duct and hollow enclosure located therebetween, for reducing internal air temperature gradient in the telescope space.

20 Claims, 5 Drawing Sheets

(51) Int. Cl.
  *G02B 23/02* (2006.01)
  *G02B 23/16* (2006.01)
  *G02B 17/08* (2006.01)

(56) References Cited

U.S. PATENT DOCUMENTS

| | | | |
|---|---|---|---|
| 5,323,271 A * | 6/1994 | Shimada | G02B 7/1815 |
| | | | 126/599 |
| 6,969,840 B1 | 11/2005 | Theriault et al. | |
| 7,471,451 B2 | 12/2008 | Dent et al. | |
| 7,699,691 B1 | 4/2010 | Voigt et al. | |
| 8,848,290 B2 | 9/2014 | Hull | |
| 2007/0097500 A1* | 5/2007 | Willey | G02B 7/008 |
| | | | 359/399 |
| 2009/0147386 A1* | 6/2009 | Sogard | G02B 7/1815 |
| | | | 359/845 |
| 2010/0028385 A1 | 2/2010 | Nassif | |
| 2012/0257275 A1* | 10/2012 | Hull | G02B 7/1815 |
| | | | 359/399 |

OTHER PUBLICATIONS

Sidgwick, J., Gamble R., Amateur Astronomer's Handbook, pp. 200-202, Courier, 1971.
Alan MacRober, "How to Successfully Beat Atmospheric Seeing," http://www.skyandtelescope.com/astronomy-equipment/beating-the-seeing/, Aug. 14, 2006.

* cited by examiner

MECHANISM, SYSTEM AND METHOD FOR REDUCING INTERNAL AIR TEMPERATURE GRADIENT IN A CENTRALLY-OBSCURED REFLECTIVE TELESCOPE

CROSS REFERENCE TO RELATED APPLICATIONS

This application claims the benefit of Israeli Patent Application No. 256709, filed on Jan. 2, 2018, entitled "Mechanism, System And Method For Reducing Internal Air Temperature Gradient In A Centrally-Obscured Reflective Telescope", which is hereby incorporated by reference in its entirety.

FIELD

The present disclosure generally relates to systems and methods for maintaining optical resolving power of telescopes subjected to variable environmental conditions, and more particularly to mechanisms, systems and methods for reducing air temperature gradient in inner spaces of telescopes.

BACKGROUND

Reflective telescopes are commonly used in astronomy as well as in various other applications for imaging remote objects at high magnification. The reflective telescopes often include rear or front refractive optical elements and in these cases are referred to as catadioptric telescopes.

Reflective telescopes are often designed such that an inner telescope space between the reflectors (e.g. mirrors) is encompassed by a tubular structure. The telescopes are often subjected to external and internal conditions causing differences of temperature between the primary mirror, secondary mirror and tubular structure. Air filling the inner telescope space resides in heat transfer with the mirrors and the structure. As a result, temperature gradients and convection currents are created in the air. The phenomenon is often referred to as "telescope tube currents" and sometimes as "thermal wake". The temperature gradients cause inhomogeneity of the air refraction index inside the telescope's optical path, resulting in optical wavefront error. This optical wavefront error degrades the optical resolving power of the telescope and represents a major issue to be addressed (Mobberley M., Lunar and Planetary Webcam User's Guide, pp. 33-36, Springer, 2006; Sidgwick, J., Gamble R., Amateur Astronomer's Handbook, pp. 200-202, Courier, 1971).

In some reflective telescopes such as in Newtonian telescopes having a rear primary mirror with no central opening, fans are used to reduce the temperature gradients. In some solutions, these fans are positioned behind the primary mirror, creating forced heat transfer of the latter with ambient air, and equalizing its temperature with one of the ambient air. In other solutions, the fans are positioned at side openings of the telescope housing, in vicinity of the primary mirror's optical surface. In this case the fan operation not only equalizes the mirror temperature with one of the ambient air, but also directly prevents development of convection air currents in vicinity of the mirror's optical surface (http://www.skyandtelescope.com/astronomy-equipment/beating-the-seeing/).

Other telescope configurations such as Cassegrain or Schmidt-Cassegrain telescopes have a rear primary mirror with a central opening and a front secondary mirror. In the Schmidt-Cassegrain telescopes the front end of the telescope housing is typically sealed by a glass plate used, inter alia, for correcting optical aberrations. The rear primary mirror although having a central opening perforation is typically sealed or semi-sealed at a rear side thereof, as it usually interfaces an optical detector or optical element for directing the incoming light therethrough. This configuration prevents ventilation of the telescope inner space and, under transient or uneven temperature conditions, suffers from severe optical sharpness loss due to the air refractive index inhomogeneity.

When using a reflective telescope such as the Cassegrain in an electro-optical payload, the telescope often operates in transient temperature conditions, arising for example, from altitude change. In the transient conditions, components of the telescope (primary and secondary mirrors, tubular structure) cool down or heat up at different rates, therefore creating considerable temperature gradients in the telescope's internal volume.

Moreover, even at steady-state conditions, the telescope is typically subjected to inhomogeneous thermal boundary environment. Inside the payload, typically there are numerous heat sources such as electronic boards, cryo-coolers, motors and focal plane arrays. Heat fluxes from these sources enter the telescope's tubular structure and primary mirror back, causing uneven heating. However, the telescope's front end and secondary mirror are typically significantly cooler, being located in vicinity of an optical window subjected to an ambient temperature at its external side.

As a result of the effects, significant air temperature gradients develop inside the telescope volume, and optical sharpness is strongly degraded because of the air refraction index inhomogeneity.

U.S. Pat. No. 3,791,713 discloses a dynamic reflective telescope system having a support and a hollow spherical housing rotatably mounted thereon. A telescope is fixedly mounted within the hollow spherical housing for rotational movement therewith. The telescope is thermally insulated from the interior of the hollow spherical housing thereby defining two distinct volumes, the volume within the telescope being maintained at essentially the same temperature as the surrounding atmosphere, whereby definition is improved by eliminating variations in the index of refraction within the telescope. Monitoring means adjusts the tangential and radial position of the individual primary mirror portions to compensate for atmospheric turbulence.

Patent application No. CN106772999 relates to the field of astronomical telescopes and discloses a lightweight primary mirror back heat control system of a large-aperture telescope, aiming to equalize the primary mirror temperature with the ambient temperature, as well as to facilitate the rejection of the mirror heat into the ambient environment in a way minimizing the telescope vibration which could be caused by the fan operation. The lightweight primary mirror back heat control system comprises a heat control fan device and a plurality of air nozzles, and the heat control fan device comprises an axial fan, a heat exchanger, eight damping rubber cylinders, four mounting angle plates, two reinforcing plates, four fixing suspension rods, four suspension rod transition plates, a flexible corrugated pipe, a mirror chamber air duct transition pipe and a heat exchanger air duct transition pipe. The lightweight primary mirror back heat control system of the large-aperture telescope has the advantages that the system is capable of providing the cold air circulation while controlling the cold air temperature to facilitate the heat transfer, and cooling fluid in a heat exchanger can bring heat of a primary mirror of the telescope away, while preventing vibration of the axial fan from transferring to the primary mirror.

U.S. Pat. No. 7,471,451 discloses a multiple field of view optical system of a type applicable in stabilized electro-optical payloads. The optical system includes a reflective telescope serving as a magnifying stage for its narrow field-of-view. The central opening in the telescope's primary mirror is occupied by lenses and therefore closed for passage of air. Hence no ventilation can be provided to the telescope's internal volume, and the system is prone to optical sharpness deterioration because of air temperature gradients.

U.S. Pat. No. 8,848,290 discloses a method of control and mitigation of thermal wake proximate to an optical element of a telescope. The position and angular orientation of a secondary mirror is finely adjusted by controlled heating of supporting struts. To prevent creation of the thermal wake in the adjacent air because of the strut heating, each strut is covered with a shroud, with a fan facilitating airflow inside the shroud, and the extracted hot air is directed outwards, not entering the telescope's optical path.

Japanese patent JPH6250102 discloses a system for rejection of heat created by control mechanisms located behind a primary mirror of an astronomical telescope. As a result, the primary mirror is maintained at temperature close to one of the ambient air; thus the convection currents and refraction index non-uniformity are prevented. The system includes a hollow enclosure located behind the primary mirror and encompassing the heat-dissipating control elements, and fans forcing air flow through the enclosure. The enclosure represents a heat exchanger, and is not a part of the optical path.

SUMMARY

Some disclosed embodiments, in one aspect thereof, provide a catadioptric optical system (CDOS) that includes: a centrally-obscured reflective telescope that includes at least a primary reflector and a secondary reflector and a telescope compartment defining a telescope space therein, where the primary and secondary reflectors are located in the telescope compartment, and wherein the primary reflector includes a central opening; rear refractive optics comprising at least one refractive optical element; a hollow enclosure located between the primary reflector and the nearest rear refractive optical element, where the hollow enclosure includes side openings; at least one air duct including at least a first opening and a second opening; and at least one airflow generation device. The first opening of the air duct faces the airflow generation device, with at least part of the airflow being directed into this air duct. The second opening of the air duct is connected to the one side opening of the hollow enclosure, for directing the air flow from the airflow generation device to the compartment for reducing internal air temperature gradient therein.

Optionally, the hollow enclosure is located such as to form a gap between the hollow enclosure and the rear side of the primary reflector, the gap being located and configured such as to direct part of the airflow exiting the hollow enclosure over the back side of the primary reflector.

The catadioptric optical system may additionally include a baffle located inside the compartment next to the opening in the primary reflector. The baffle may be for example a coned baffle being coaxially located in respect to the primary reflector.

According to some embodiments, the baffle includes at least one perforation located next to an optical surface of the primary reflector for improving reduction of air temperature gradient in the vicinity of the primary reflector.

According to some embodiments of the CDOS, the hollow enclosure comprises a spectral beam-splitter made in a form of a hollow pentaprism, and the rear refractive optics farther comprises at least two separate spectral channels.

The catadioptric optical system can be configured for being mounted inside an electro-optical payload that is encased by a housing including a front optical window facing the back of the secondary reflector. The electro-optical payload optionally comprises at least one heat exchanger. The heat exchanger may include multiple heat conductive element.

Additionally or alternatively, the air duct comprises a manifold passageway for allowing directing air flow from the at least one airflow generation device to the telescope compartment and also to other areas in the CDOS.

Optionally, another gas other than air can be used inside the CDOS such as yet not limited to nitrogen.

Some disclosed embodiments, according to another aspect thereof, provide a mechanism for reducing internal air temperature gradients in a catadioptric optical system (CDOS) comprising a centrally-obscured reflective telescope and at least one rear refractive optical element. The mechanism includes: at least one air duct including a first opening and a second opening; a hollow enclosure including side openings, the hollow enclosure being located at a rear side of the reflective telescope such that one side opening thereof faces a central opening of a primary reflector of the reflective telescope, and another side opening thereof faces the rear refractive optical element; and at least one airflow generation device. The first opening of the air duct faces the at least one airflow generation device, with at least part of the airflow therefrom being directed into the air duct, and the second opening of the air duct is located such as to direct air flow therefrom into the reflective telescope through one side opening of the hollow enclosure, for reducing internal air temperature gradient in the reflective telescope.

The hollow enclosure is optionally located such as to form a gap between the hollow enclosure and the rear side of the primary reflector, this gap being located and configured such as to direct part of the airflow exiting the hollow enclosure over the back side of the primary reflector.

The mechanism may also include a baffle, such as a coned baffle, located inside the telescope compartment next to the opening in the primary reflector. The baffle may include at least one perforation located next to an optical surface of the primary reflector, for improving temperature gradient reduction at the primary reflector area.

In some embodiments, the mechanism further comprises at least one heat exchanger optionally comprising multiple heat conductive elements.

According to some embodiments of the mechanism, the air duct comprises a manifold passageway for allowing directing air flow from the at least one airflow generation device to multiple areas in the reflective telescope.

According to yet another aspect of some embodiments, there is provided a method for reducing internal air temperature gradients in a catadioptric optical system with a front centrally-obscured reflective telescope. The method includes at least the steps of: providing at least one air duct including a first opening and a second opening; providing a hollow enclosure including side openings, the hollow enclosure being located at a rear side of the reflective telescope such that its side opening faces a central opening of a primary reflector thereof; providing at least one airflow generation device; and ventilating the front centrally-obscured reflective telescope by directing air from the at least one airflow generation device into the front centrally-obscured reflective telescope through the air duct and the hollow enclosure, wherein the ventilation of the front centrally-obscured reflective telescope reduces air temperature gradient therein.

DETAILED DESCRIPTION OF SOME EMBODIMENTS

Figure 1:
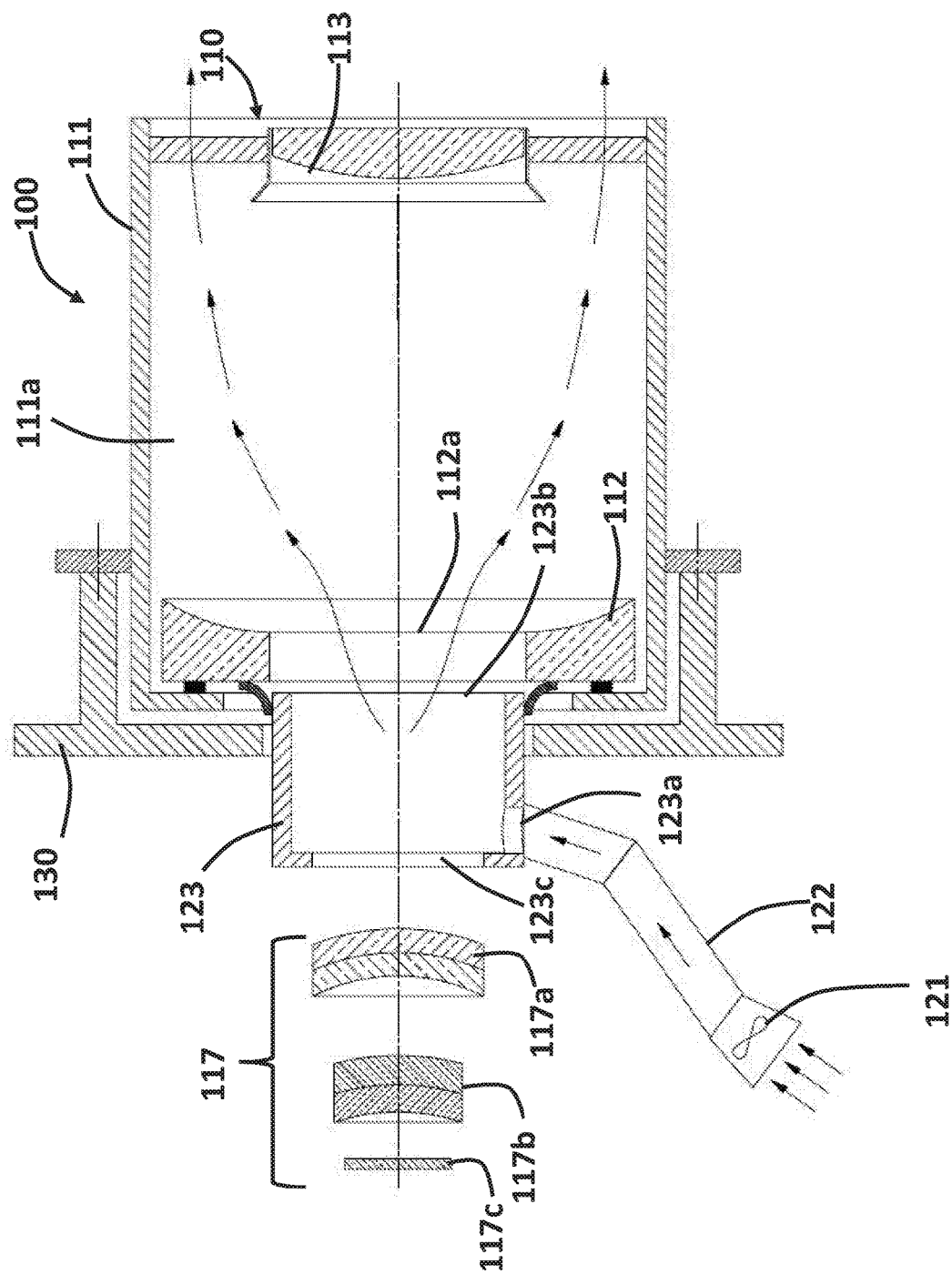
FIG. 1 shows a cross sectional view of a catadioptric optical system (CDOS), according to some embodiments of the present disclosure.

In the following detailed description of various embodiments, reference is made to the accompanying drawings that form a part thereof, and in which are shown by way of illustration specific embodiments in which the present disclosure may be practiced. It is understood that other embodiments may be utilized and structural changes may be made without departing from the scope of the present disclosure.

Some embodiments of the present disclosure provide innovative mechanisms, systems and methods for reducing spatial temperature gradient inside telescope spaces, particularly in centrally-obscured reflective telescopes such as reflective telescopes that includes a primary reflector (for example, a concaved mirror) including a central opening and a secondary reflector (for example, a convex mirror).

According to some embodiments of the present disclosure, there is provided a catadioptric optical system for reducing internal air temperature gradients. The catadioptric optical system (CDOS) includes at least a centrally-obscured reflective telescope including a primary reflector (for example, a concaved primary mirror), a secondary reflector (for example, a convex secondary mirror) and a compartment defining a telescope space therein. The primary and secondary reflectors are located inside the telescope space in the compartment. The primary reflector includes a central opening for passage of light therethrough. The CDOS also includes: rear refractive optics comprising one or more refractive optical elements such as lenses, optical detectors and the like; a hollow enclosure located between the primary reflector and the nearest rear refractive optical element; one or more air ducts, each including at least two openings; and at least one airflow generation device, such as a fan. The hollow enclosure includes one or more side openings and may include one or more optical elements such as an optical window or a dichroic spectral beam splitter. The hollow enclosure allows both passage of air therethrough as well as passage of optical light rays from the primary reflector to the rear refractive optics.

A first opening of the air duct faces the airflow generation device, with at least part of the airflow being directed into this air duct, and a second opening of the air duct is connected to the side opening of the hollow enclosure, for directing the airflow from the airflow generation device into the telescope space in the telescope compartment for reducing internal air temperature gradient therein and ultimately for reducing spatial refractive index gradient in the telescope space.

The compartment of the telescope of the CDOS can also include a baffle such as yet not limited to, a cone baffle, located next to the opening in the primary reflector.

According to some embodiments of the CDOS, the hollow enclosure is made in a form of a hollow pentaprism spectral beamsplitter, where the rear refractive optics farther include at least two separate spectral channels.

The catadioptric optical system may be mounted inside an electro-optical payload, encased by a housing including a front optical window facing the back of the secondary reflector for introducing light therethrough. The electro-optical payload may also include one or more heat exchangers including multiple heat conductive elements. The heat exchanger may be configured for rejecting heat from air contained inside the housing to the external environment, wherein an ingress of the airflow generation device may face the heat exchanger.

According to some embodiments of the disclosure, the air duct includes or is a part of a manifold passageway including one or more ingresses facing corresponding one or more airflow generation devices and multiple egresses, for allowing directing airflow from each airflow generation device to the telescope space in the compartment and also to other areas in the CDOS or payload.

Another gas may be used inside the telescope space instead of air such as, yet not limited to, nitrogen, where the configuration of the CDOS is used for the same purpose of reducing temperature gradient inside the telescope compartment for reducing spatial refractive index therein.

Some embodiments of the present disclosure further provide a mechanism for reducing internal air temperature gradients in a catadioptric optical system (CDOS) including a centrally-obscured reflective telescope and at least one rear refractive optical element. The mechanism includes at least one air duct including a first opening and a second opening; a hollow enclosure including side openings; and at least one airflow generation device such as one or more fans.

The hollow enclosure may be located at a rear side of the reflective telescope such that its front opening faces an opening of a primary reflector thereof, and its rear opening faces the rear refractive optical element(s).

The first opening of the air duct faces the airflow generation device, with at least part of the airflow therefrom being directed into the air duct, and the second opening of the air duct is located such as to direct airflow therefrom into the reflective telescope through the side opening(s) in the hollow enclosure.

Some embodiments of the present disclosure further provide a method for reducing air temperature gradient in reflective telescope spaces by providing the CDOS discussed above and ventilating the inner telescope space in the telescope compartment by directing airflow from the one or more airflow generation devices into this telescope space via the air duct and openings of the hollow enclosure.

Reference is now made to FIG. 1, schematically illustrating a catadioptric optical system (CDOS) 100, according to some embodiments of the present disclosure, including a mechanism for reducing air temperature gradient in a reflective telescope 110 of the CDOS 100.

The reflective telescope 110 includes a telescope compartment 111 defining a telescope space 111a therein, a primary reflector 112, which is a concaved mirror including a central opening 112a perforated therethrough and a secondary reflector 113, which is a convex mirror.

The CDOS 100 also includes a mechanism for reducing temperature gradient inside the telescope space 111a. This mechanism includes a fan 121 airflow generation device, an air duct 122 including one opening thereof facing the fan 121, and a hollow enclosure 123 including multiple openings. The hollow enclosure in this case includes three openings: a first opening 123a facing a second opening of the air duct 122, a second opening 123b located behind the central opening 112a of the primary reflector 112 and a third opening 123c facing rear optics 117 of the CDOS 100. The air duct 122 and hollow enclosure 123 form an air passageway between the fan 121 and the telescope compartment 111 inner space 111a for allowing ventilation of that telescope space 111a to reduce spatial refractive index gradient therein, for preventing optical distortions of the light inside the telescope space 111a.

Ventilation of the telescope space 111a by the fan 121 via the air duct 122 and hollow enclosure 123 directly facilitates mixing of the air in the telescope space 111a and prevents formation of air temperature gradients and convection currents inside the telescope space 111a. Moreover, the ventilation facilitates equalization of temperature between the primary mirror 112, secondary mirror 113 and telescope compartment shroud 111, further reducing the tendency to formation of air temperature gradients.

The CDOS 100 may also include rear refractive optics 117 such as lenses 117a and 117b and one or more optical detectors such as detector 117c for manipulating and/or detecting light from the telescope primary reflector 112. The rear refractive optics 117 is enclosed in a casing (not shown at FIG. 1 and the following FIGS. 2,3,4,5). The casing is attached to the hollow enclosure 123, and prevents the air exit from the opening 123c.

Optionally, the CDOS 100 is located inside a housing structure, in which case the reflective telescope 110 may be held by a holding apparatus such as a bench structure 130.

Figure 2:
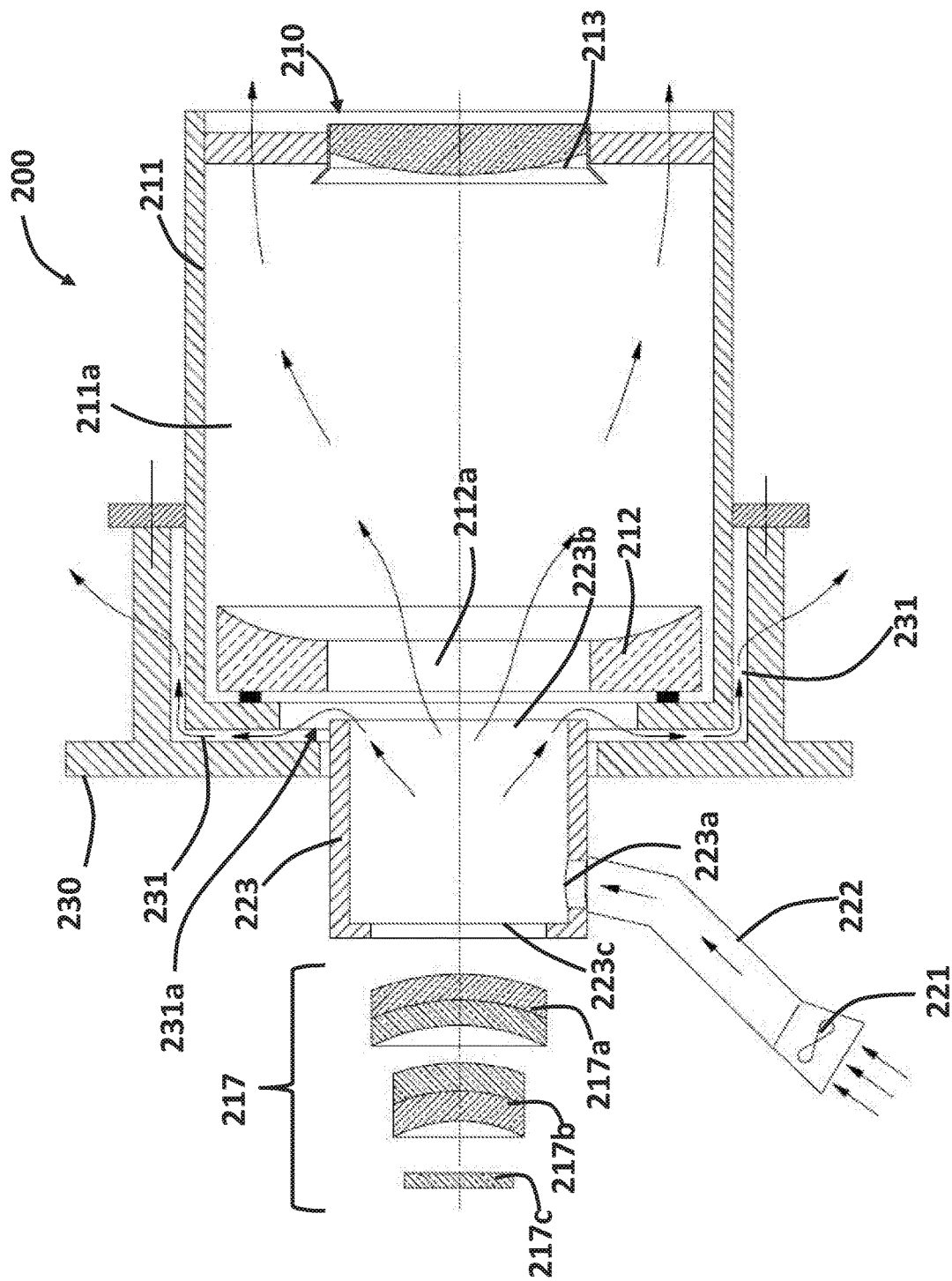
FIG. 2 shows a cross sectional view of a catadioptric optical system (CDOS) including an additional air channel behind a reflective telescope of the CDOS, according to other embodiments of the present disclosure.

Reference is now made to FIG. 2, schematically showing a CDOS 200, according to another embodiment of the present disclosure. The CDOS 200 includes a reflective telescope 210 including a telescope compartment 211, defining a telescope space 211a therein, a primary reflector 212 and secondary reflector 213 both located inside the telescope compartment 211. The primary reflector 212 in this example is a concaved mirror including a central opening 212a and the secondary reflector 213 is a convex mirror.

The CDOS 200 also includes a fan 221 airflow generation device, a hollow enclosure 223 and an air duct 222 that includes two openings: one opening facing the fan 221 airflow generation device and another opening facing the hollow enclosure 223. The hollow enclosure 223 includes three openings: a first opening 223a facing the second opening of the air duct 222, a second opening 223b, facing the central opening 212a of the primary reflector 212 and a third opening 223c facing the rear optics 217. The air duct 222 and hollow enclosure 223 and openings thereof form an air passageway between the fan 221 and the telescope compartment 211 interior telescope space 211a and thereby allow flow of air from the fan 221 and into that telescope space 211a for ventilating thereof.

The CDOS 200 may also include rear refractive optics 217 such as lenses 217a and 217b and one or more optical detectors such as detector 217c for manipulating and/or detecting light from the telescope primary reflector 212.

The CDOS 200 is located inside a housing structure where the reflective telescope 210 is held by a bench structure 230. The bench structure 230 and telescope 210 are configured such that a gap therebetween forms an air channel 231 between the primary reflector 212 central opening 212a and the second opening 223b of the hollow enclosure 232. The air channel 231 creates an air passage 231a in the area of the primary reflector 212 to improve ventilation of the back side thereof. This ventilation reduces heating of the primary reflector by the heat emanating from the bench structure 230, thus reducing the temperature inhomogeneity between the telescope components, and, as result, further reducing the air temperature gradients inside the telescope space.

In both FIGS. 1 and 2 the hollow enclosure 123/223 includes a rectangular or cylindrical shape and three openings: a first opening 123a/223a facing the air duct 122/222 the second opening 123b/223b facing the central opening 112a/212a of the primary reflector 112/212 and a third opening 123c/223c facing the rear optics 117/217. Other possible designs of the hollow enclosure of the CDOS of some embodiments of the present disclosure may be used depending on system requirements.

Figure 3:
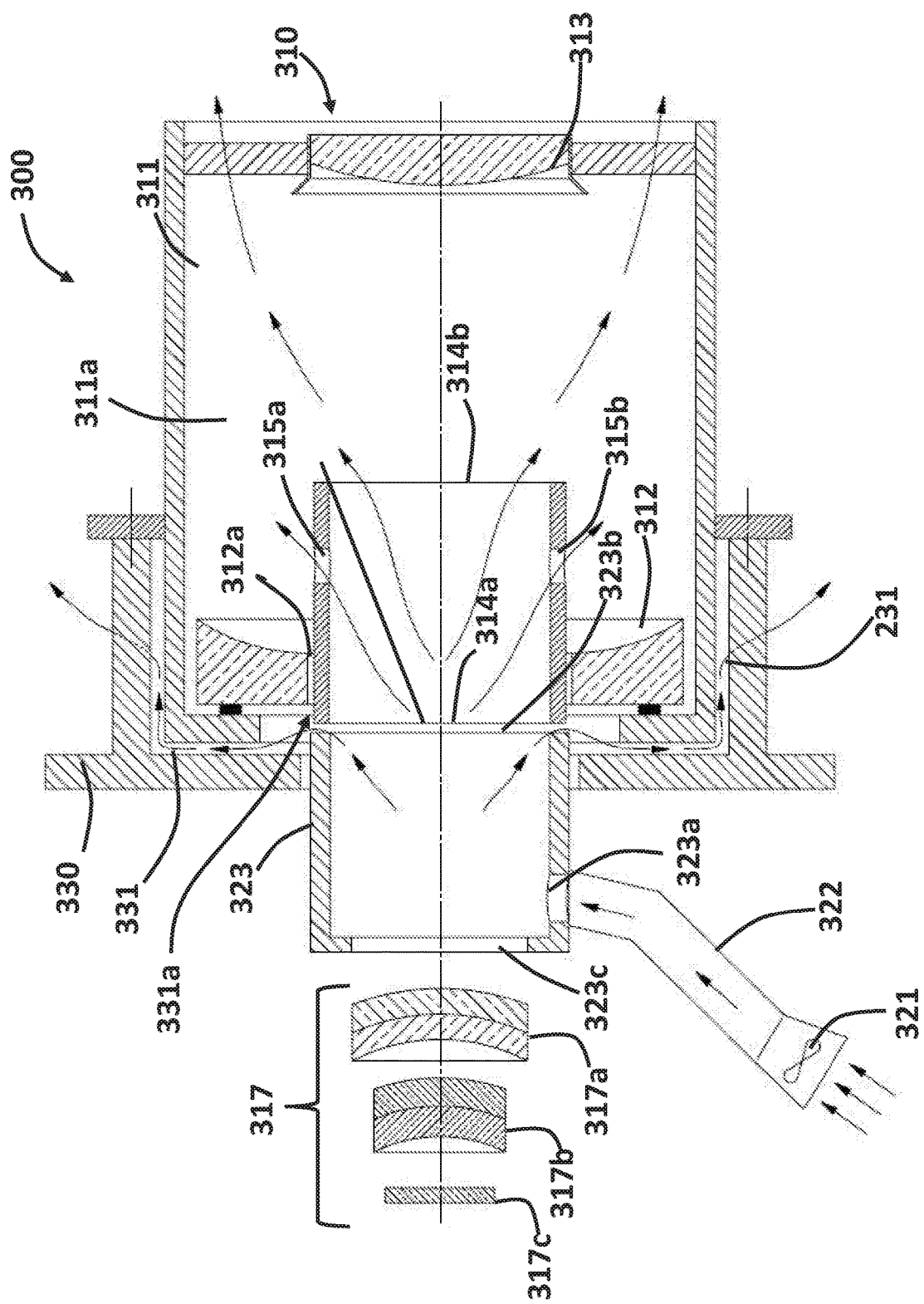
FIG. 3 shows a cross sectional view of a catadioptric optical system (CDOS) including a reflective telescope with a perforated baffle, according to other embodiments of the present disclosure.

Reference is now made to FIG. 3, schematically illustrating a CDOS 300, according to other embodiments of the present disclosure. The CDOS 300 includes a reflective telescope 310 including a telescope compartment 311, defining a telescope space 311a therein, a primary reflector 312 and a secondary reflector 313. The primary reflector 312 in this example is a concaved mirror including a central opening 312a and the secondary reflector 313 is a convex mirror.

The CDOS 300 also includes a fan 321 airflow generation device, a hollow enclosure 323 and an air duct 322 that includes two openings: one opening facing the fan 321 airflow generation device and another opening facing the hollow enclosure 323. The hollow enclosure 323 includes three openings: a first opening 323a facing the second opening of the air duct 322, a second opening 323b, facing the central opening 312a of the primary reflector 312 and a third opening 323c facing rear optics 317 of the CDOS 300. The air duct 322 and hollow enclosure 323 and openings thereof form an air passageway between the fan 321 and the telescope compartment 311 interior telescope space 311a via the central opening 312a of the primary reflector 312 and thereby allow convection of air from the fan 321 and into that telescope space 311a for ventilating thereof.

The CDOS 300 also includes rear refractive optics 317 such as lenses 317a and 317b and one or more optical detectors such as detector 317c for manipulating and/or detecting light from the telescope primary reflector 312.

The CDOS 300 is located inside a housing structure where the reflective telescope 310 is held by a bench structure 330. The bench structure 330 and telescope 310 are configured such as to form an air channel 331 between the primary reflector 312 central opening 312a and the second opening 323b of the hollow enclosure 332 forming an air passage 331a therebetween to improve ventilation of the primary reflector 312 area.

Additionally, the CDOS 300 also includes a baffle 314 located inside the telescope compartment 311 adjacent to the frontal side of the primary reflector 312. The baffle 314 includes two main openings a rear opening 314a facing the frontal side of the primary reflector 312 central opening 312a, and a front opening 314b at its front side opposite the rear opening 314a.

Optionally, the baffle 314 includes multiple perforations such as perforations 315a and 315b for improving telescope space 311a ventilation at the area in vicinity of the concave optical surface of primary reflector 312. These perforations 315a and 315b may be significantly smaller in size than the rear and front openings 314a and 314b of the baffle 314 and may be located in proximity to the primary reflector 312.

The baffle 314 of the CDOS 300 can be a coned baffle including a cylindrical housing, or any other known in the art baffle used for reflective telescopes depending on CDOS 100 optical requirements.

The perforated baffle telescope ventilation improvement option can be implemented in addition to the ventilation improvement suggested by the air channel design formed between the bench structure and the telescope compartment in the primary reflector area or alternatively as a standalone improvement design.

Figure 4:
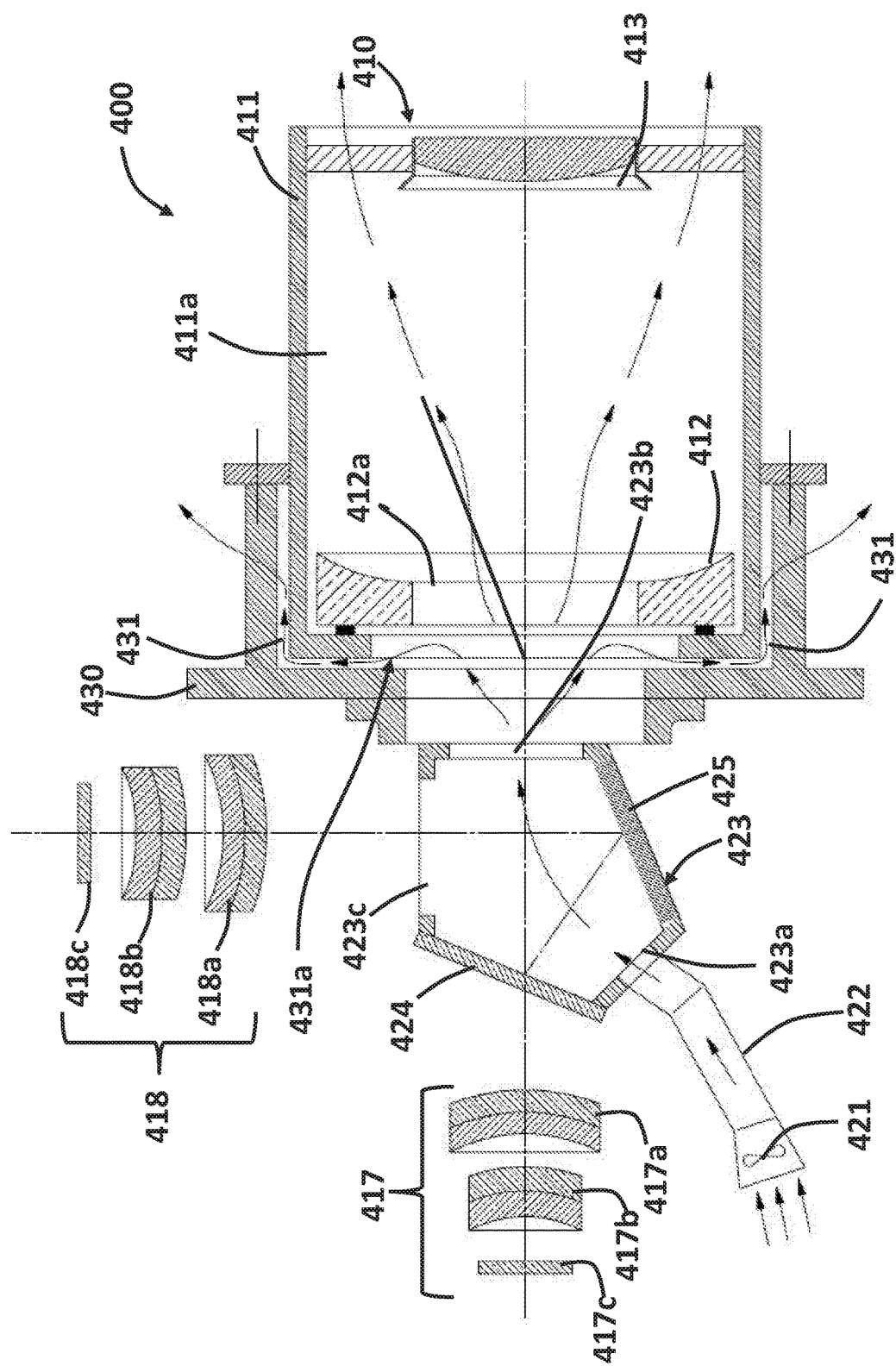
FIG. 4 shows a cross sectional view of a catadioptric optical system (CDOS) including a hollow enclosure which includes a beam splitter, according to additional embodiments of the present disclosure.

Reference is now made to FIG. 4, illustrating a CDOS 400 including a hollow enclosure 423 including an optical element embedded therein, according to some embodiments of the present disclosure.

The CDOS 400 includes a reflective telescope 410 including a telescope compartment 411 defining a telescope space 411a therein, a primary reflector 412, which is a concaved mirror including a central opening 412a perforated therethrough and a secondary reflector 413, which is a convex mirror.

The CDOS 400 also includes a mechanism for reducing temperature gradient inside the telescope space 411a. This mechanism includes a fan 421 airflow generation device, an air duct 422 including one opening thereof facing the fan 421, and a hollow enclosure 423 including multiple openings. The hollow enclosure 423 in this case is a spectral beam-splitter made in a form of a hollow pentaprism.

The hollow pentaprism enclosure 423 includes a reflective surface 425 connecting to a side thereof or designed as a reflector 425. For example, this surface 425 may be coated with a reflective (mirror) coating. Another non-adjacent surface of the enclosure 423 includes a beam splitter 424. This configuration allows the incoming light from the central opening 412a of the primary reflector 412 to partially be directed towards a first rear optics 417 of the CDOS 400 and partially be directed towards a second rear optics 418.

The hollow enclosure 423 includes three openings: a first opening 423a facing a second opening of the air duct 422, a second opening 423b located behind the central opening 412a of the primary reflector 412 and a third opening 423c facing the second rear optics 418 of the CDOS 400.

The first and second rear optics 417 and 418 may include optical elements such as lenses 417a, 417b, 418a and 418b and/or optical detectors such as detectors 417c and 418c.

The air duct 422 and hollow enclosure 423 form an air passageway between the fan 421 and the telescope compartment 411 inner space 411a for allowing ventilation of that telescope space 111a to reduce spatial refractive index gradient therein.

Optionally, the CDOS 400 is located inside a housing structure, in which case the reflective telescope 410 may be held by a holding apparatus such as a bench structure 430. The bench structure 430 may be located and configured such as to form one or more air channels such as air channel 431 behind the primary reflector 412 and externally to the telescope compartment 411, forming an air passage 431a in this area, for improving ventilation of the primary reflector 412.

Figure 5:
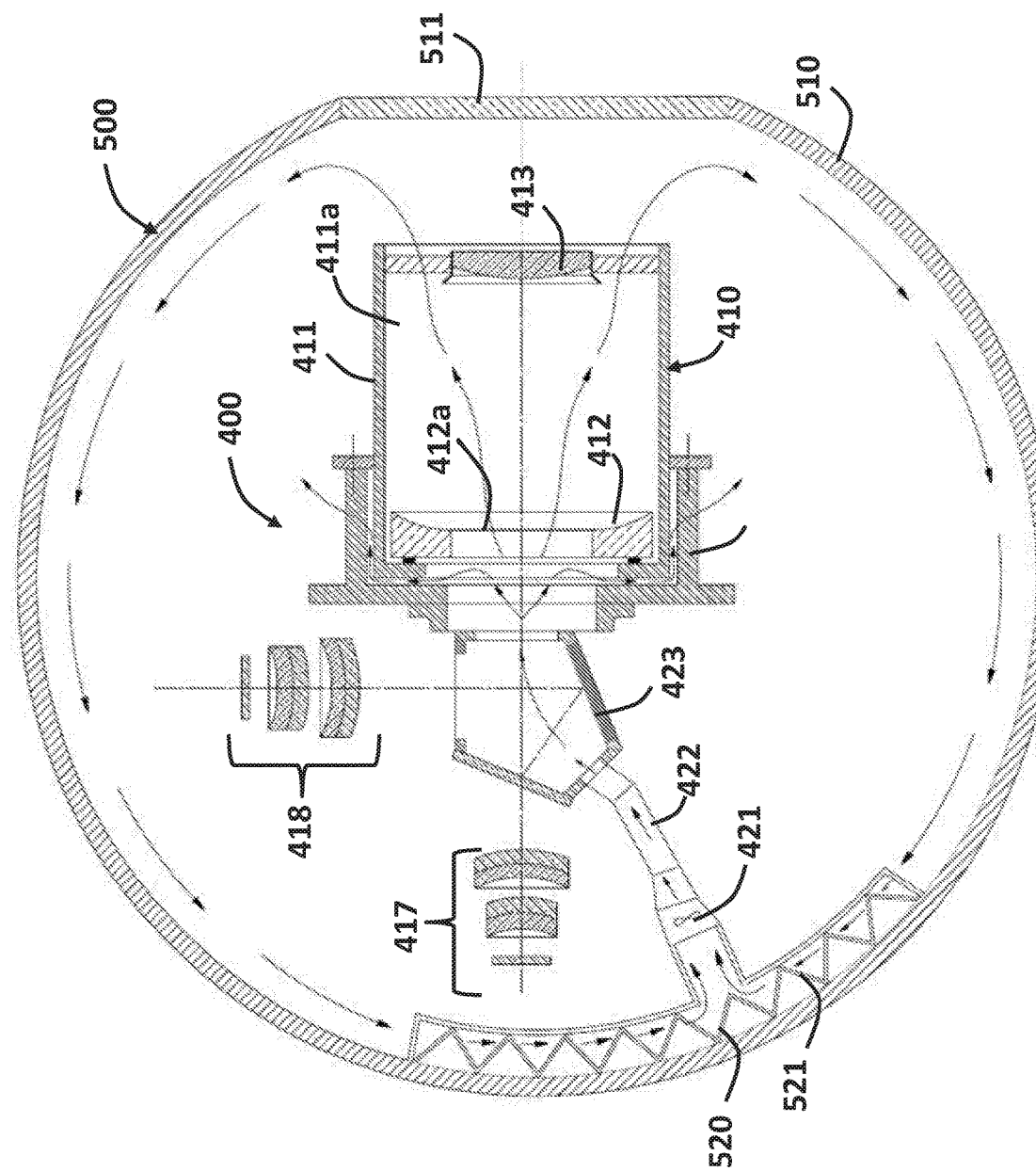
FIG. 5 shows a cross sectional view of the catadioptric optical system (CDOS) of FIG. 4, being embedded in an electro-optical payload, according to some embodiments of the present disclosure.

Reference is now made to FIG. 5, schematically illustrating the CDOS 400 serving as part of an electro-optical payload 500, according to another embodiment of the present disclosure. In this embodiment, the optical payload 500 includes a payload housing 510 including a spherical configuration. The payload housing 510 includes a window 511 made of a transparent material located adjacent and in front of the secondary reflector 413 of the reflective telescope 410 for introducing light therethrough into the reflective telescope 410. The optical payload 500 also includes a heat exchanger 420 including multiple heat conductive elements 421 such as fins, arms, ribs and the like for improving transfer of heat from within the electro-optical payload 500 inner space into the external ambient air surrounding the payload.

In other embodiments of the present disclosure, other additional solutions may be added to further reduce temperature gradient in the telescope space of the CDOS or combinations of several additional solutions. For example, In some embodiments of the present disclosure in which the reflective telescope also includes a perforated baffle, an air channel or any other gap configuration between the primary reflector and the hollow enclosure may be add providing a combined solution for reduction of temperature gradient in the primary reflector area as well as in the entire telescope space.

The catadioptric optical systems of some embodiments of the present disclosure may be implemented in electro-optical payloads as shown above, or in any other optical systems. The electro-optical payload in which the CDOS of some embodiments of the present disclosure is implemented may be any electro-optical payload known in the art such as electro-optical payloads used in observatory and/or surveillance aircrafts, watercrafts and the like.

The rear refractive optics of the CDOS of some embodiments the present disclosure may include any optical and optionally additional electronic, communication and/or computing devices and systems known in the art allowing directing, manipulating and/or transformation of the optical signals arriving from the reflective telescope of the CDOS as well as processing and transmitting these optical signals.

The rear refractive optics of the CDOS of some embodiments the present disclosure may include any known in the art devices and systems that allow optical detection, direction or transformation.

Some embodiments of the present disclosure also provides a method for reducing internal air temperature gradients in a catadioptric optical system with a front centrally-obscured reflective telescope. The method includes at least the steps of: providing at least one air duct including a first opening and a second opening; providing a hollow enclosure including at least two side openings, the hollow enclosure being located at a rear side of the reflective telescope such that its side opening faces an opening of a primary reflector thereof; providing at least one airflow generation device; and ventilating the front centrally-obscured reflective telescope by directing air from the at least one airflow generation device into the front centrally-obscured reflective telescope through the air duct and the openings of the hollow enclosure, wherein the ventilation of the front centrally-obscured reflective telescope reduces air temperature gradient therein.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A catadioptric optical system comprising:
    a centrally-obscured reflective telescope, including at least a primary reflector and a secondary reflector and a telescope compartment defining a telescope space therein, said primary and secondary reflectors being located in said telescope compartment, wherein said primary reflector includes a central opening;
    rear refractive optics comprising at least one refractive optical element, said rear refractive optics being located externally from said telescope compartment;
    a hollow enclosure located between said primary reflector and a nearest refractive optical element of said rear refractive optics, said hollow enclosure including side openings;
    at least one air duct including a first opening and a second opening; and
    at least one airflow generation device,
    wherein the first opening of said at least one air duct faces said at least one airflow generation device, with at least part of an air flow, generated thereby, being directed into said air duct, and the second opening of said air duct faces one side opening of the hollow enclosure, an other side of said hollow enclosure opening facing said central opening of the primary reflector, configured to direct the air flow from said at least one airflow generation device to said telescope space via said air duct, configured to reduce internal air temperature gradient in said telescope space.

2. The catadioptric optical system according to claim 1, wherein said hollow enclosure is located to form a gap between said hollow enclosure and a rear side of said primary reflector, said gap being located and configured to direct part of an airflow exiting the hollow enclosure over a back side of said primary reflector.

3. The catadioptric optical system according to claim 1 further comprising a baffle located inside said telescope compartment in an area of the central opening of the primary reflector.

4. The catadioptric optical system according to claim 3, wherein said baffle includes a coned baffle being coaxially located in respect to said primary reflector.

5. The catadioptric optical system according to claim 3, wherein said baffle includes at least one perforation located in a vicinity of an optical surface of the primary reflector.

6. The catadioptric optical system according to claim 1, wherein said hollow enclosure comprises a spectral beam-splitter in a form of a hollow pentaprism, and said rear refractive optics further comprises at least two separate spectral channels.

7. The catadioptric optical system according to claim 1, wherein said catadioptric optical system is mounted inside an electro-optical payload, encased by a housing including a front optical window facing said secondary reflector configured to introduce light therethrough.

8. The catadioptric optical system according to claim 7, wherein said electro-optical payload comprises at least one heat exchanger.

9. The catadioptric optical system according to claim 1, wherein said at least one air duct comprises a manifold passageway and is configured to allow directing air flow from said at least one airflow generation device to said telescope compartment and to other areas in said catadioptric optical system.

10. The catadioptric optical system according to claim 1, wherein nitrogen or gas other than air is used in said catadioptric optical system.

11. A mechanism for reducing internal air temperature gradients in a catadioptric optical system comprising a centrally-obscured reflective telescope including a telescope compartment defining a telescope space therein, and at least one rear refractive optical element, said mechanism comprising:
    at least one air duct including a first opening and a second opening;
    a hollow enclosure including side openings, said hollow enclosure being located at a rear side of said reflective telescope such that one side opening thereof faces a central opening of a primary reflector of the reflective telescope, and another side opening thereof faces the second opening of said air duct; and
    at least one airflow generation device,
    wherein the first opening of said at least one air duct faces said at least one airflow generation device, with at least part of an airflow therefrom being directed into said air duct, and the second opening of said air duct is located to direct air flow therefrom into the reflective telescope through said side openings in the hollow enclosure, configured to reduce internal air temperature gradient in said reflective telescope.

12. The mechanism according to claim 11, wherein said hollow enclosure is located to form a gap between said hollow enclosure and the rear side of said primary reflector, said gap being located and configured to direct part of the airflow exiting the hollow enclosure over a back side of said primary reflector.

13. The mechanism according to claim 11 further comprising a baffle located inside said telescope compartment next to the opening in the primary reflector.

14. The mechanism according to claim 13, wherein said baffle includes a coned baffle being coaxially located in respect to said primary reflector.

15. The mechanism according to claim 13, wherein said baffle includes at least one perforation located next to an optical surface of the primary reflector.

16. The mechanism according to claim 11, wherein said hollow enclosure comprises a spectral beam-splitter in a form of a hollow pentaprism, and said rear refractive optical element comprises at least two separate spectral channels.

17. The mechanism according to claim 11 further comprising at least one heat exchanger.

18. The mechanism according to claim 17, wherein said heat exchanger comprises a plurality of heat conductive elements.

19. The mechanism according to claim 11, wherein said at least one air duct comprises a manifold passageway configured to allow directing air flow from said at least one airflow generation device to multiple areas in said reflective telescope.

20. A method for reducing internal air temperature gradients in a catadioptric optical system with a front centrally-obscured reflective telescope, said method comprising:
    providing at least one air duct including a first opening and a second opening;
    providing a hollow enclosure including side openings, said hollow enclosure being located at a rear side of said reflective telescope such that one of its side openings faces a central opening of a primary reflector of said reflective telescope;

providing at least one airflow generation device; and ventilating said front centrally-obscured reflective telescope by directing air from said at least one airflow generation device into said front centrally-obscured reflective telescope through said air duct and the side openings of said hollow enclosure, wherein said ventilating of the front centrally-obscured reflective telescope reduces air temperature gradient therein.

* * * * *